United States Patent
Carter

(10) Patent No.: US 8,317,079 B2
(45) Date of Patent: Nov. 27, 2012

(54) CLINCHING METHOD AND TOOL FOR PERFORMING THE SAME

(75) Inventor: Jon T. Carter, Farmington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 871 days.

(21) Appl. No.: 12/247,973

(22) Filed: Oct. 8, 2008

(65) Prior Publication Data
US 2010/0084456 A1 Apr. 8, 2010

(51) Int. Cl.
*B23K 20/12* (2006.01)
(52) U.S. Cl. ..................... 228/112.1; 228/2.1
(58) Field of Classification Search ............ 228/2.1, 228/112.1; 156/73.5
See application file for complete search history.

(56) References Cited

U.S. PATENT DOCUMENTS

| | | | |
|---|---|---|---|
| 6,536,651 B2 | 3/2003 | Ezumi et al. | |
| 6,843,405 B2 | 1/2005 | Okamoto et al. | |
| 7,080,438 B2 | 7/2006 | Murakami | |
| 7,367,487 B2 | 5/2008 | Murakawa et al. | |
| 2004/0079787 A1* | 4/2004 | Okamoto et al. | 228/112.1 |
| 2004/0144830 A1 | 7/2004 | Murakami | |
| 2004/0155094 A1 | 8/2004 | Okamoto et al. | |
| 2006/0213954 A1 | 9/2006 | Ruther et al. | |
| 2008/0067215 A1 | 3/2008 | Gendon | |

FOREIGN PATENT DOCUMENTS

| | | | |
|---|---|---|---|
| JP | 2007136505 A | * | 6/2007 |
| JP | 2007216259 | | 8/2007 |
| WO | WO 2007058293 | | 5/2007 |

OTHER PUBLICATIONS

JPO machine translation of JP 2007-136505.*
"Understanding the basic differences between direct drive friction welding and inertia friction welding", Friction & Inertia Welding Services, http://www.frictionwelding.com/report4.htm, Dec. 5, 2006.*

* cited by examiner

*Primary Examiner* — Jessica L Ward
*Assistant Examiner* — Kevin E Yoon
(74) *Attorney, Agent, or Firm* — Dierker & Associates, P.C.

(57) ABSTRACT

A clinching method includes establishing a first layer on a second layer. The first layer has an aperture formed therein and is thinner than the second layer. A rotating punch is engaged with the second layer through the aperture in the first layer, thereby generating frictional heat and softening the second layer. The rotating punch is configured with at least a first diameter, a shoulder, and a second diameter that is larger than the first diameter. The rotating punch is pressed into the softened second layer, thereby causing at least some of the second layer to: back extrude through an annulus defined by the aperture in the first layer and at least one of the diameters of the punch; contact the shoulder of the rotating punch; and extend onto a surface of the first layer adjacent the aperture.

16 Claims, 1 Drawing Sheet

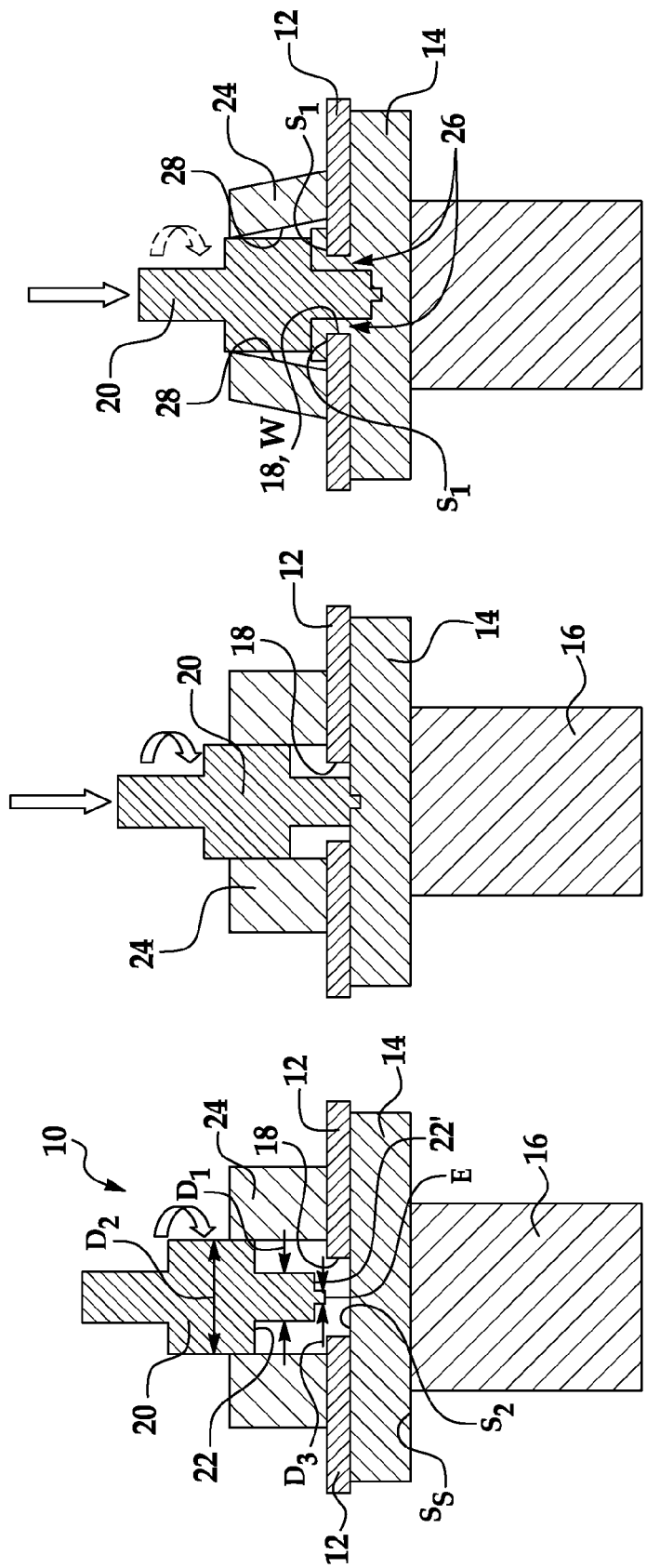

CLINCHING METHOD AND TOOL FOR PERFORMING THE SAME

TECHNICAL FIELD

The present disclosure relates generally to a clinching method and a tool for performing the same.

BACKGROUND

Materials may be secured together using many different methods, including, for example, hot clinching and friction stir spot welding. Hot clinching techniques often result in the thermal expansion of the materials. Friction stir spot welding often results in brittle phase formation when joining different materials (e.g., aluminum and magnesium). An attempt to decrease or prevent brittle phase formation in friction spot welding includes adding an interlayer to the materials to be joined. The addition of an interlayer adds manufacturing steps and potentially cost to the process. Other techniques may result in the splitting or cracking of the clinch button.

SUMMARY

A clinching method includes establishing a first layer on a second layer. The first layer has an aperture formed therein and is thinner than the second layer. A rotating punch is engaged with the second layer through the aperture in the first layer, thereby generating frictional heat and softening the second layer. The rotating punch is configured with at least a first diameter, a shoulder, and a second diameter that is larger than the first diameter. The rotating punch is pressed into the softened second layer, thereby causing at least some of the second layer to: back extrude through an annulus defined by the aperture in the first layer and at least one of the diameters of the punch; contact the shoulder of the rotating punch; and extend onto a surface of the first layer adjacent the aperture.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 1A through 1C together schematically illustrate an example of the clinching method.

DETAILED DESCRIPTION

Embodiments of the clinching method disclosed herein advantageously form a mechanical joint between two materials by back extruding a softened material through an aperture formed in a material overlying the softened material. Alignment of the rotating punch with the aperture is simplified because the aperture is visible and accessible (compared to an aperture formed in the underlying material). Furthermore, friction stir spot welding of the two materials is not utilized to form a joint between the two materials, and additional rivets or other joining elements are not required to clinch the materials together.

Referring now to FIG. 1A, a schematic illustration of a clinching tool 10 is depicted having first and second layers 12, 14 secured therein. The tool 10 includes a support 16 which has a surface $S_S$ that receives and supports the layers 14, 12 during the operation of the tool 10. In a non-limiting example, the support 16 is made from hardened tool steel, has a 15 mm diameter, and is 10 mm thick.

It is to be understood that the second layer 14 may be positioned on the support 16, and then the first layer 12 may be established thereon; or the first layer 12 may be established on the second layer 14 and then the stack of layers 12, 14 may be positioned on the support 16. The first and second layers 12, 14 are, in an embodiment, preformed sheets or components such as, for example, preformed automotive body parts (e.g., fenders and reinforcing panels). It is to be understood that the layers 12, 14 may also be joined together (e.g., as sheets) and then formed into a desirable component.

One layer 12 (and an aperture 18 formed therein) overlies at least a portion of the other layer 14 at least at an area where it is desirable to join the two layers 12, 14 together. In some instances, the first layer 12 will completely overlie the second layer 14; in other instances, the first layer 12 will partially overlie the second layer 14; and in still other instances, the first layer 12 will extend beyond the second layer 14 (as shown in FIGS. 1A-1C).

The first layer 12 generally has a ductility that is relatively low (e.g., less than about 30% elongation at failure in uniaxial tensile tests). It is to be understood, however, that the ductility of the first layer 12 is generally not critical to the method disclosed herein. This is due, at least in part, to the fact that the first layer 12 does not undergo any deformation during processing. On the other hand, the ductility of the second layer 14 has a ductility, at the temperature produced by frictional heating, of at least 30% in order to form a desirably strong clinch joint.

Non-limiting examples of the first layer 12 include magnesium alloyed with at least aluminum and zinc such as, e.g., Magnesium Alloy AZ31B or Magnesium Alloy AZ91D. Non-limiting examples of the second layer 14 include aluminum alloyed with at least magnesium such as, e.g., Aluminum Alloy 5754 or Aluminum Alloy 5083.

The first layer 12 is generally thinner than the second layer 14. The thickness of the layers 12, 14 is generally determined by the requirements of the resulting product, and the diameter of the aperture 18 is determined by the thicknesses of the layers 12, 14 and a desired joint strength. In a non-limiting example, layer 12 may be an automotive decklid panel that is about 1.3 mm in thickness of a magnesium alloy (e.g., magnesium alloy AZ31B), and layer 14 may be a latch reinforcement that is about 2.6 mm in thickness of an aluminum alloy (e.g., aluminum alloy 5754-O). In some instances, the thickness of the second layer 14 is at least twice the thickness of the first layer 12.

As previously mentioned, the first layer 12 has the aperture 18 formed therein. The aperture 18 may be any desirable size and/or shape, including circular or polygonal (e.g., triangular, square, rectangular, etc.). The aperture 18 is pre-formed in the first layer 12, before the first layer 12 is established on the second layer 14. In one example, a material of the first layer 12 is deposited, and then the aperture 18 is formed therein via a mechanical process or patterning process. For example, a tool separate from tool 10 is used to punch or drill the aperture 18 in layer 12 before the layers 12, 14 are secured in the tool 10.

The tool 10 further includes a rotating punch 20. In a non-limiting example, the rotating punch 20 is made from hardened tool steel. The rotating punch 20 includes at least a first diameter $D_1$, a second diameter $D_2$ that is larger than the first diameter $D_1$, and a shoulder 22 which extends from the section of the punch 20 having the first diameter $D_1$ to the section of the punch 20 having the second diameter $D_2$. It is to be understood that the smaller diameter(s) (e.g., diameter $D_1$ shown in FIG. 1A) of the punch 20 is equal to or smaller than the size of the aperture 18 so that the punch 20 is able to protrude through the aperture 18 and contact the second layer 14. It is to be further understood that the largest diameter (e.g., diameter $D_2$ shown in FIG. 1A) of the punch 20 is greater than the size of the aperture 18 so that the back-extruded material of the second layer 14 (shown in FIG. 1C) flows laterally onto the surface $S_1$ of first layer 12.

As shown in FIG. 1A, the rotating punch 20 may also include a third diameter $D_3$, which is smaller than both the first and second diameters $D_1$ $D_2$, and a second shoulder 22' which extends from the section of the punch 20 having the first diameter $D_1$ to the section of the punch 20 having the third diameter $D_3$. The section of the punch 20 having the smallest diameter may have a flat, pointed, or bullet-shaped end E which initially contacts the second layer 14.

In one example, the sections of the punch 20 each have a circular cross section. It is to be understood that the cross sectional shape of the punch sections may be some shape other than circular. As previously mentioned, the diameter $D_2$ is generally larger than the largest diameter of the aperture 18 so that the punch 20 cannot go through the aperture 18. This configuration allows back-extruded material to flow laterally on top of the first layer 12. However, the smaller diameters $D_1$ and $D_3$ are configured so that they are smaller than the smallest diameter of the aperture 18 so they can extend through the aperture 18. For example, if the cross sectional shape of the sections of the punch 20 is square, the diagonal length of the smaller sections is small enough to protrude through the aperture 18 and engage the second layer 14 therethrough, while the diagonal length of the largest section is too large to protrude through the aperture 18.

When the layers 12, 14 are positioned in the tool 10, the support 16 receives the second layer 14, and the punch 20 is adjacent to the aperture 18 of the first layer 12. Such positioning enables the punch 20 (when engaged) to extend through the aperture 18 and contact the second layer 14. As previously mentioned, since the aperture 18 is formed in the top most layer (i.e., first layer 12), alignment of the punch 20 with such aperture 18 is easily achieved.

The tool 10 also includes a retractable clinching die 24. When the layers 12, 14 are positioned in the tool 10, the retractable clinching die 24 contacts the first layer 12. The layers 12, 14 are positioned between the retractable clinching die 24 and the support 16. Furthermore, the clinching die 24 is mounted either on its own actuator (not shown, and separate from the actuator that moves the punch) or on springs attached to an actuator (also not shown) that enables the punch 20 to move axially. If the clinching die 24 is mounted to springs, the clinching die 24 will also function as a stripper ring to facilitate removal of the layers 12, 14 from the tool 10 immediately after the clinching process is complete and the punch 20 is withdrawn. If the clinching die 24 is mounted on its own separate actuator, the control of the force between the clinching die 24 face and the first layer 12 is independently controllable, but the clinching die 24 may still function as a stripper ring to facilitate removal of the layers 12, 14 from the tool 10 immediately after the clinching process is complete and the punch 20 is withdrawn.

Referring now to FIG. 1B, in an example of the clinching method, the punch 20 is rotated (as indicated by the semi-circular arrow) and is placed into contact with the surface $S_2$ of the second layer 14 that is exposed through the aperture 18 in the first layer 12. The punch 20 is pressed downward toward the second layer surface $S_2$ through the aperture 18. The contact between the rotating punch 20 and the second layer 14 generates frictional heat which causes the second layer 14 to soften. Generally, the time at which the second layer 14 surface $S_2$ is exposed to the rotating punch 20 as it is rotated depends, at least in part, on the temperature that is sufficient to soften the layer 14 and the rotation speed of the punch 20. Rotation of the rotating punch 20 generally occurs at several thousand (e.g., 5,000 or less) RPMs for up to several seconds (e.g., 2-4 seconds). This time frame is believed to strike a balance between robustness and throughput.

It is to be understood that the first layer 12 is generally not softened or deleteriously affected by the frictional heat generated between the rotating punch 20 and the second layer 14.

After the portion of the second layer 14 located adjacent to the aperture 18 is sufficiently soft, the punch 20 is pressed further through the aperture 18 and into at least a portion of the thickness of the second layer 14, as shown in FIG. 1C. The second layer 14 is considered to be "sufficiently soft" when it is exposed to a temperature having an upper limit of about the melting temperature of the material of the layer 14 (e.g., about 550° C. for aluminum alloys). The lower limit of the temperature depends at least in part upon the power of the clinching tool 10 and the speed of clinching. In an example, the lower limit may be about 200° C. for aluminum alloys. As such, the temperature used to achieve a sufficiently soft layer 14 may vary depending, at least in part, on the material of the layer 14, the power of the tool 10, the speed of clinching, the localization of the heating, and the duration of the heating.

It is to be understood that the punch 20 may continue to be rotated as it is pressed into the second layer 14, or rotation of the punch 20 may be stopped prior to being pressed. The selective rotation of the rotating punch 20 during pressing is depicted by the arrow in phantom in FIG. 1C. Additional rotation of the punch 20 may be desirable, for example, if further softening of the second layer 14 is desirable during pressing.

The pressing of the punch 20 into the softened second layer 14 causes some of the softened layer 14 to extrude back through an annulus 26. The annulus 26 is generally defined between one or more side walls W of the aperture 18 and a section of the punch 20 having diameter $D_1$. When the aperture 18 is circular, a single sidewall W helps to define the annulus 26, and when the aperture is polygonal, multiple sidewalls W help define the annulus 26. The back extruded portion of the second layer 14 is forced through the annulus 26, at least in part because the annulus 26 provides a space into which the compressed second layer 14 can move.

The pressing of the punch 20 is continued until the flowing second layer 14 contacts the shoulder 22 of the rotating punch 20 (or in some instances the second shoulder 22' of the rotating punch 20, depending, at least in part, on the thickness of the first layer 12 and the length of the section with the third diameter $D_3$). The shoulder 22 (or second shoulder 22') forces the back extruded material of the second layer 14 to flow onto the surface $S_1$ of the first layer 12 that is adjacent to the aperture 18. As pressing continues, the second layer 14 then moves laterally across the surface $S_1$. Generally, the more the rotating punch 20 is pressed, the further the portion of the second layer 14 extends across the surface $S_1$. The presence of the second layer 14 through the annulus 26 and on the surface $S_1$ of the first layer 12 forms a button-back joint with macro-interlocking between the two layers 12, 14.

As shown in FIG. 1C, the laterally moving portions of the second layer 14 may contact the interior wall(s) 28 of the retractable clinching die 24. The lateral movement of the second layer 14 pushes the interior wall(s) 28 such that it is angularly offset from its initial position (which is shown in FIGS. 1A and 1B). The initial position of the clinching die interior wall(s) 28 is substantially perpendicular to the surface $S_S$ of the support 16 and/or the surface $S_1$ of the first layer 12. Since the surface $S_S$ of the support 16 and/or the surface $S_1$ of the first layer 12 is generally horizontal (i.e., at 0°), the initial position of the clinching die interior walls(s) 32 is about 90°. As used herein, the term substantially perpendicular means that the initial position is 90° plus or minus 5° from the surface $S_S$ and/or the surface $S_1$. In some instances, the initial position of the clinching die interior walls(s) 28 is about 90° plus or minus 10° from the surface $S_S$ and/or the surface $S_1$. It is to be understood, however, that the probability of the final workpiece cracking increases as the initial position of the clinching die interior walls(s) 28 varies from 90°.

When the second layer 14 contacts the interior walls(s) 28, the die 24 shifts such that one area of the interior walls(s) 28 continues to contact the punch 20, while the other area of the interior walls(s) 28 is pushed radially outward from the punch 20. Once the desirable amount of the second layer 14 flows onto the surface $S_1$, the punch 20 is no longer pressed. The punch 20 is then removed from the layers 12, 14, and the clinched layers 12, 14 are allowed to cool and harden.

After the layers 12, 14 are removed from the tool 10, the retractable clinching die 24 retracts such that the walls 28 return to the initial position, and the tool 10 is ready to receive other layers 12, 14 for clinching. In a non-limiting example, the layers 12, 14 are removed by axially retracting the punch 20 and the clinching die 24 and laterally removing the joined layers 12, 14 from the tool 10.

While several embodiments have been described in detail, it will be apparent to those skilled in the art that the disclosed embodiments may be modified. Therefore, the foregoing description is to be considered exemplary rather than limiting.

The invention claimed is:

1. A clinching method, comprising:
   establishing a first layer on a second layer, the first layer having an aperture formed therein and being thinner than the second layer;
   engaging a rotating punch with the second layer through the aperture in the first layer, thereby generating frictional heat and softening the second layer, the rotating punch configured with at least a first diameter, a shoulder, a second diameter that is larger than the first diameter, a third diameter that is smaller than both the first and second diameters, and a second shoulder extending from the first diameter to the third diameter, an end of the third diameter initially contacting the second layer; and
   pressing the rotating punch into the softened second layer, thereby causing at least some of the second layer to: back extrude through an annulus defined by the aperture in the first layer and a section of the punch having at least one of the diameters; contact the shoulder of the rotating punch; and extend onto a surface of the first layer adjacent the aperture.

2. The clinching method as defined in claim 1 wherein the shoulder of the rotating punch causes the back extruded second layer to flow laterally onto the surface of the first layer.

3. The clinching method as defined in claim 2, further comprising continuing pressing the rotating punch into the second layer such that the laterally flowing second layer contacts an interior wall of a clinching die that contacts the first layer, thereby pushing the clinching die interior wall such that it is angularly offset from its initial position.

4. The clinching method as defined in claim 3 wherein the initial position of the clinching die interior wall is substantially perpendicular to the surface of the first layer.

5. The clinching method as defined in claim 1 wherein prior to engaging, the method further comprises aligning the rotating punch with the aperture in the first layer.

6. The clinching method as defined in claim 1 wherein the first diameter is smaller than a diameter of the aperture in the first layer.

7. The clinching method as defined in claim 1, further comprising:
   rotating the rotating punch during engaging; and
   stopping rotation of the rotating punch during pressing.

8. The clinching method as defined in claim 7 wherein the rotating punch is rotated at 5,000 RPM or less during engaging.

9. The clinching method as defined in claim 1, further comprising:
   rotating the rotating punch during engaging; and
   continuing rotation of the rotating punch during pressing.

10. The clinching method as defined in claim 1 wherein the aperture is a polygon, and wherein sidewalls of the polygonal aperture and a section of the punch having the first diameter define the annulus.

11. The clinching method as defined in claim 1 wherein the aperture is a circle, and wherein a sidewall of the circular aperture and a section of the punch having the first diameter define the annulus.

12. The clinching method as defined in claim 1 wherein a thickness of the second layer is at least twice a thickness of the first layer.

13. The clinching method as defined in claim 1, further comprising removing the rotating punch from the first and second layers.

14. The clinching method as defined in claim 1 wherein the second layer forms a mechanical joint with portions of the first layer adjacent the aperture.

15. The clinching method as defined in claim 1 wherein the end of the third diameter is flat, pointed, or bullet-shaped.

16. The clinching method as defined in claim 3 wherein the interior wall of the clinching die stops the laterally flowing second layer at a predetermined distance from the annulus.

* * * * *